3,453,208
LOW FRICTION BEARINGS WITH IMPROVED
WEAR PROPERTIES
John P. Gallagher, Morrisville, and Frederick L. Walters, Levittown, Pa., assignors to Thiokol Chemical Corporation, Bristol, Pa., a corporation of Delaware
No Drawing. Filed Oct. 4, 1966, Ser. No. 584,100
Int. Cl. F16c 33/12; F16d 69/02; C10m 7/14
U.S. Cl. 252—12                                           9 Claims

ABSTRACT OF THE DISCLOSURE

A low friction bearing having good wearing properties is provided and is based on a composition of matter formed from a mixture comprising from about 38 to 95 percent by weight of a high molecular weight moldable polyethylene sulfide resin, from 3 to 60 percent by weight of polytetrafluoroethylene, from 1 to 40 percent by weight of a silicate filler such as, calcium silicate, and of an anti-cleavage agent, such as, molybdenum disulfide, said silicate and an anti-cleavage agent being present in a synergistic ratio by weight to each other.

---

This invention relates to bearings and more particularly to new and improved bearings and a method of producing the same. More particularly, the invention is directed to a high molecular weight thermoplastic bearing composition having incorporated therein polyeterafluoroethylene (hereinafter called PTFE), a silicate and a material having anti-cleavage properties.

Bearing materials which are filled with hard filler particles to improve the wear characteristics are well known in the art. While these filler materials have generally been successful in decreasing wear characteristics of the bearing material, they have all had the common disadvantage of increasing its coefficient of friction. Furthermore, damage has been done to the mating surfaces by the use of the harder filler materials such as alumina.

It is therefore an object of this invention to provide a bearing material which not only has a low coefficient of friction but which also provides long-wearing characteristics. It is another object of this invention to provide a bearing material, and a method for making the same, comprising a high molecular weight thermoplastic resin and having a low coefficient of friction and improved wear characteristics. It is still another object of this invention to improve the frictional properties and the wear characteristics of a bearing material comprising a high molecular weight thermoplastic resin and PTFE. These and further objects and advantages will be apparent from the invention herein described.

The bearing material of this invention comprises a mixture of one or more high molecular weight thermoplastic resin materials (other than PTFE) in the amount of 38 to 95 percent by weight, PTFE in the amount of 3 to 60 percent by weight, a silicate in the amount of 1 to 40 percent by weight and a material having anti-cleavage properties in the amount of 1 to 40 percent by weight and wherein the percentages are based on the total weight of the bearing composition. The PTFE, silicate and material having anti-cleavage properties are present in the total amount of about 5 to 62 weight percent of the total bearing material. It has been unexpectedly found that a bearing material of this composition not only has improved wear characteristics as compared with a bearing material composed solely of a high molecular weight thermoplastic and PTFE, but also has improved frictional properties. In addition, the bearing material of this invention has the advantage of being relatively economical due to the large proportion of high molecular weight, thermoplastic resin other then PTFE, present in the bearing composition. Moreover, the advantages of this invention are unexpectedly attained regardless of the particle shape of the silicate and material having anti-cleavage properties which are added to the high molecular weight, thermoplastic/PTFE bearing composition.

The term "bearing" as used herein, includes any machine element subject to a sliding movement relative to another element, and to electrical contacts such as current collectors, commutator segments, terminal elements and the like which may or may not be subject to relative sliding movement. The term includes anti-friction bearings which have a rolling element between the shaft and the housing as well as bushings and sleeve bearings which reduce friction by containing the shaft in a well-lubricated environment.

The term "high molecular weight, thermoplastic resin" is used to mean a thermoplastic resin having mechanical properties which would be suitable in a bearing application and does not include PTFE. In specific, the high molecular weight, thermoplastic resin of this invention is a material other than PTFE having a softening point of at least about 95° C. as determined by ASTM method D1525,[1] a flexural modulus of 200,000 lb./in.$^2$ as determined by ASTM Method D790,[1] a Rockwell hardness of M50 as determined by ASTM Method D758[1] and a tensile strength of 3,000 p.s.i. as determined by ASTM Method D638.[1] Exemplary of high molecular weight, thermoplastic resins which are suitable for this invention are polyalkylene sulfide and especially polyethylene sulfide, polyacetal, polysulfone, polypropylene oxide, polycarbonate and polyimide resin. Polyethylene sulfide resin is particularly preferred because of its chemical and solvent resistance which makes it especially desirable in a number of bearing applications. Exemplary of a suitable high molecular weight moldable polyethylene sulfide resin suitable for this invention is the resin disclosed in copending application S.N. 511,341 filed Dec. 3, 1965, in the names of R. H. Gobran and S. W. Osborn, now U.S. 3,365,431. The resin, as taught in the patent, has a positive melt index at 215° C. below about 1.5 grams per minute.

The PTFE used in this invention may be in a variety of forms. For example, it may be sintered or unsintered or it may be granular or fibrous in form.

Exemplary of the silicates useful in this invention are magnesium silicate, aluminum silicate, potassium aluminum silicate, calcium silicate, iron aluminum silicate, mica and asbestos fibers. The shape of the silicates may be varied. For example, they may be needle-shaped, disc-shaped or ball-shaped.

Materials having anti-cleavage properties which are useful in this invention are those materials known to the art which are hard and yet have lubricating properties. Exemplary of materials having anti-cleavage properties are graphite, molybdenum disulfide, tungsten disulfide, and mixed metal sulfides such as are disclosed in U.S. 2,977,302 such as ferric sulfide-molybdenum sulfide, cadmium sulfide-molybdenum sulfide and lead sulfide-molybdenum sulfide mixtures.

Bearings may be made according to this invention by admixing the high molecular weight, thermoplastic resin with the other ingredients and then forming the bearings from such admixtures by molding, extrusion, compacting and curing, or similar processes. Alternately the bearing may be made by first heating the high molecular weight thermoplastic resin above its softening point until this resin becomes a liquid and then adding the other materials to the liquid resin thus formed. The admixture is then

[1] 1966 Book of ASTM Standards, Parts 26–30.

placed in the desired mold and cooled to form a solid bearing.

Bearings of this invention may be in any of the forms known to the art, such as for example, in a unitary form wherein the body of the bearing is composed solely of bearing material or in a composite form wherein the bearing material of this invention is incorporated in a metal matrix, e.g. the bearing material is in the form of a layer bonded to a steel or other metal backing.

0:100 to 100:0. The examples show that "wear" is greatly reduced while at the same time maintaining a low or improved coefficient of friction when calcium silicate and molybdenum disulfide are used in combination as additives in the basic poly(ethylene sulfide)-PTFE bearing composition as compared to those examples where either carcium silicate or molybdenum disulfide are used separately in this basic bearing composition.

| Example No | 8 | 9 | 10 | 11 | 12 |
|---|---|---|---|---|---|
| Bearing composition (parts by weight): | | | | | |
| Ethylene sulfide polymer | 74 | 74 | 74 | 74 | 74 |
| PTFE (granular-unsintered) | 18.5 | 18.5 | 18.5 | 18.5 | 18.5 |
| Calcium silicate | 7.5 | 5.0 | 3.75 | 2.5 | 0 |
| Molybdenum disulfide | | 2.5 | 3.75 | 5.0 | 7.5 |
| Properties of the bearing compositions: | | | | | |
| $K \times 10^{-10}$ after 112 hours wear at a PV of 13,333 | 500 | 300 | 250 | 250 | 350 |
| Bearing weight loss due to wear, p.b.w., after 112 hours per 1.16 p.b.w. of sample | 0.0128 | 0.0082 | 0.0072 | 0.0078 | 0.0096 |
| Coefficient of friction: | | | | | |
| Static | .121 | .116 | .116 | .117 | .135 |
| Dynamic | .116 | .107 | .115 | .117 | .135 |

The following examples are merely illustrative of this invention and are not intended as a limitation upon the scope thereof.

Examples 1–7

A bearing in the form of a bushing is made by injection molding a substantially homogeneous mixture of a bearing formulation at a temperature of about 210° C. and at a pressure of about 10,000 pounds per square inch. The thus molded bearings are then tested for wear on an apparatus employing a rotating motion. The bearing material specimen is pressed against a rotating steel wheel. $K^2$ values are used as a measure of the wear properties at a given PV [3] to make comparisons of the wear of the different bearing materials. The lower the K value, the better the wear properties are at a given PV.

| Example No | 1 | 2 | 3 | 4 | 5 | 6 | 7 |
|---|---|---|---|---|---|---|---|
| Bearing compositions, percent by weight: | | | | | | | |
| Ethylene sulfide polymer [1] | 80 | 59 | 59 | 59 | 59 | 59 | 59 |
| PTFE (granular-unsintered) | 20 | 26 | | 26 | 26 | 26 | 26 |
| PTFE (granular-sintered) | | | 26 | | | | |
| Calcium silicate | | 7.5 | 7.5 | | | | 7.5 |
| Magnesium silicate | | | | 7.5 | | | |
| Aluminum silicate | | | | | 7.5 | | |
| Aluminum-magnesium silicate | | | | | | 7.5 | |
| Molybdenum disulfide | | 7.5 | 7.5 | 7.5 | 7.5 | 7.5 | |
| Tungsten disulfide | | | | | | | 7.5 |
| Wear properties of the bearing compositions: $K \times 10^{-10}$ after 192 hours wear at PV 22770 | 265 | 8 | 23 | 14 | 8 | 8 | 32 |

[1] Ethylene sulfide polymer is prepared according to the process of copending application S. N. 511,341 filed December 3, 1965 in the names of R. H. Gobran and S. W. Osborn, now U.S. 3,365,431.

Examples 8–12

Bearings are produced and tested as in Examples 1–7. Examples 8–12 show a comparison of the wear properties and coefficient of friction of bearings when the ratio of calcium silicate to molybdenum disulfide is varied from Examples 13–15

Bearings prepared and tested as in Examples 1–7 had the following compositions and properties:

| Example No | 13 | 14 | 15 | 16 |
|---|---|---|---|---|
| Bearing composition (parts by weight): | | | | |
| Ethylene sulfide polymer | 74 | 74 | 74 | 80 |
| PTFE | 18.5 | 18.5 | 18.5 | 20 |
| Calcium silicate | 5 | | 2.5 | |
| Mica | | 5 | | |
| Molybdenum disulfide, p.b.w | 2.5 | 2.5 | | |
| Graphite | | | 5 | |
| Bearing composition properties: | | | | |
| $K \times 10^{-10}$ after 100 hours of wear at a PV of 3,000 | 15 | 50 | 50 | 290 |
| Coefficient of friction: | | | | |
| Static | .1301 | .1520 | .1690 | .1977 |
| Dynamic | .1301 | .1520 | .1640 | .1521 |

We claim:

1. A bearing in which at least the composition of the surface to wear comprises a mixture consisting essentially of from about 38 to 95 percent by weight of a high molecular weight, moldable polyethylene sulfide resin, from about 3 to 60 percent polytetrafluoroethylene, from about 1 to 40 percent by weight of one admixed first other bearing ingredient material, calcium silicate, and from about 1 to 40 percent by weight of one admixed second other bearing material, molybdenum disulfide, said first and second other bearing materials being present in the composition in a synergistic ratio by weight to each other.

2. A bearing as in claim 1 wherein the amount of polyethylene sulfide resin is present in the mixture in an amount of from about 59 to 74 percent by weight.

3. A bearing as in claim 1 wherein the amount of polytetrafluoroethylene is present in an amount of from about 18.5 to about 26 percent by weight.

4. A bearing as in claim 1 wherein the other bearing ingredient materials are present in the composition in a ratio of between about 2.1 to about 1.2.

[2] $K = \Delta$ volume/PVT wherein $\Delta$ volume is change in volume of the bearing sample expressed in cubic inches, P is load in pounds, V is the velocity in ft./min., and T is time of run in hours.

[3] PV=Load in pounds per square inch of bearing surface×velocity in ft./min.

5. A bearing as in claim 1 wherein the other bearing ingredient materials are present in the composition in a ratio of about 1:1.

6. A moldable composition of matter consisting essentially in admixture per 100 parts by weight of from about 59 to about 74 parts of high molecular weight moldable polyethylene sulfide resin, from about 18.5 to about 26 parts of polytetrafluoroethylene, up to about 7.5 parts of calcium silicate filler, and up to about 7.5 parts of molybdenum disulfide anti-clevage material, said filler and anti-clevage material essentially being present in a synergistic ratio by parts to each other.

7. A composition as in claim 6 wherein the filler and the anti-clevage material are present in the composition in a ratio of between about 2:1 to about 1:20.

8. A composition as in claim 6 wherein the filler and the anti-clevage material are present in the composition in a ratio of about 1:1.

9. A bearing of which at least the composition of the bering surface subject to wear is molded from the composition according to claim 6.

References Cited

UNITED STATES PATENTS

| | | | |
|---|---|---|---|
| 2,400,099 | 5/1946 | Brubaker et al. | 252—12 |
| 3,122,505 | 2/1964 | Rulon-Miller et al. | 252—12 |
| 3,222,326 | 12/1965 | Brodoway | 260—79.7 |
| 3,287,288 | 11/1966 | Reiling | 260—900 |
| 3,290,412 | 12/1966 | Goldbum | 260—900 |
| 3,314,916 | 4/1967 | Cupery | 260—900 |
| 3,365,431 | 1/1968 | Gobron et al. | 260—79.7 |

MORRIS LIEBMAN, *Primary Examiner.*

J. H. DERRINGTON, *Assistant Examiner.*

U.S. Cl. X.R.

252—12.4; 260—41, 873, 900